United States Patent

Martin et al.

[15] 3,646,815

[45] Mar. 7, 1972

[54] SILICON PRESSURE TRANSDUCER CIRCUIT

[72] Inventors: John C. Martin, Lyndhurst; William L. Thompson, Alliance, both of Ohio

[73] Assignee: Bailey Meter Company

[22] Filed: Mar. 26, 1970

[21] Appl. No.: 22,977

[52] U.S. Cl. .................................73/398 AR, 73/393
[51] Int. Cl. ..........................................G01l 9/08
[58] Field of Search ...........73/398 AR, 393, 88.5 R, 88.55 D

[56] References Cited

UNITED STATES PATENTS 3,518,886  7/1970  Talmo et al. .....................73/88.5 X

*Primary Examiner*—Donald O. Woodiel
*Attorney*—John F. Luhrs

[57] ABSTRACT

A remote coupled transducer circuit having a pair of conductors extending to the remote location from which the pressure transducer circuit is energized and to which an output current signal proportional to the pressure applied to a diaphragm of semiconductor material is transmitted on the pair of conductors. The transducer circuit includes an L-type resistance bridge formed of a piezoresistor and a second resistor diffused into the diaphragm, and the piezoresistor is linearly pressure sensitive while the second resistor is pressure insensitive. The resulting change of resistance in the piezoresistor due to pressure applied to the diaphragm is voltage amplified in a differential amplifier. The pressure transmitter circuit is temperature compensated against the effects of temperature variations of the resistance bridge. The output signal from the differential amplifier is used to proportionally change the output current signal. The output current signal controls a feedback transistor in the transducer circuit which rebalances the differential amplifier while sustaining the output current signal at the value proportional to the applied pressure.

15 Claims, 4 Drawing Figures

INVENTORS
JOHN C. MARTIN
BY WILLIAM L. THOMPSON

INVENTORS
JOHN C. MARTIN
BY WILLIAM L. THOMPSON
John F. Lukes 3,646,815

SILICON PRESSURE TRANSDUCER CIRCUIT

BACKGROUND OF THE INVENTION

1. Field of the Invention

The present invention relates generally to differential measuring circuits, and, more particularly, to a semiconductor, transducer circuit for converting variable applied pressure to a linearly proportional electrical output signal.

The invention is particularly applicable to a transducer circuit for remotely measuring a change in pressure applied across a silicon diaphragm and will be described with particular reference thereto although it will be appreciated that the invention has broader applications such as in any transducer system wherein a linear and accurate measurement of a change in an unknown variable is desired.

2. Description of the Prior Art

Electronic transducer circuits have heretofore comprised piezoresistive bridge circuits basically of the Wheatstone variety wherein two junctions of the bridge are provided with a source of electrical excitation and the remaining junctions of the bridge are used to couple the electrical output signal indicative of the measured pressure variable to a readout device.

In bridge circuits of the above type, the problem of matching the temperature coefficients of the resistance elements of the bridge is formidable. One of the problems in correcting for temperature coefficient mismatch is the need for bridge rebalancing necessitated by the correction. It has previously been proposed to compensate for the temperature coefficient mismatch of the bridge elements by connecting resistors, which are not materially temperature-sensitive, in series and in shunt relationship with arms of the four-element bridge, but external to the bridge, as described, for example, in U.S. Pat. No. 3,447,362 issued on June 3, 1969 to H. S. Pien.

One of the principal problems with a pressure transducer of this type is the necessary inclusion of four diffused resistor elements to form the Wheatstone bridge arrangement; temperature coefficient matching of the diffused resistors is thereby aggravated. Another inherent problem with this bridge arrangement is that it requires two pair of conductors for operability, one pair for bridge excitation and one pair for read out. This requirement is particularly burdensome where excitation and readout devices are remotely connected to the pressure transducer.

The present invention contemplates new and improved apparatus which overcomes all of the above referred problems and others and provides a silicon pressure transducer circuit which reduces the number of elements previously required in the diffused resistor bridge arrangement, requires a single pair of conductors for remote energization and readout, is simple, accurate and insures maximum reliability.

SUMMARY OF THE INVENTION

In accordance with the present invention there is provided a transducer circuit for converting the pressure applied to a diaphragm of one type semiconductor material into a linear proportional electrical output signal, comprising: a piezoresistor and a first resistor, both of the opposite type semiconductor material, diffused into the diaphragm to form a L-type resistance bridge; circuit means, connected between the corner and outer ends of the bridge, for amplifying the difference signal generated between the outer ends of the bridge when pressure is applied to the diaphragm and for proportionally changing the output current signal to provide a measurement of the applied pressure; and, feedback circuit means, responsive to the output current signal, for rebalancing the amplifying circuit means while sustaining the output current signal at the value proportional to the applied pressure.

Further, in accordance with the invention, a transducer circuit as described above is provided, wherein the amplifying circuit means includes output current regulating means and a pair of conductors connected thereto which extend to a remote location from which the pressure transducer circuit is energized and to which the output current signal proportional to the applied pressure is transmitted on the pair of conductors.

Still further, in accordance with the invention, a transducer circuit as described above is provided, additionally including circuit means for temperature compensating the amplifying circuit means so that the amplified difference signal is substantially independent of the resistance variations caused by temperature changes of the resistance bridge.

Still further, in accordance with the invention, a transducer circuit as described above is provided, wherein the feedback circuit means functions to maintain the output current signal at a value substantially dependent on pressure applied to the diaphragm only and substantially independent of temperature and resistance changes in the pair of conductors as well as changes in the value of a series connected load resistor up to a predetermined maximum value.

The invention also provides means for balancing the difference signal when a minimum pressure is applied, means for adjusting the output current signal to a predetermined minimum value, and means for adjusting the span of output current signal between the minimum value and a predetermined maximum value.

The principal object of the invention is to provide a transducer circuit for simply and accurately measuring a change in pressure applied across a semiconductor diaphragm.

Another important object of the invention is to provide a pressure transducer circuit which is energized from a remote location on a pair of conductors over which the output current signal is transmitted to the remote location.

DESCRIPTION OF THE PREFERRED EMBODIMENTS

Figure 1:
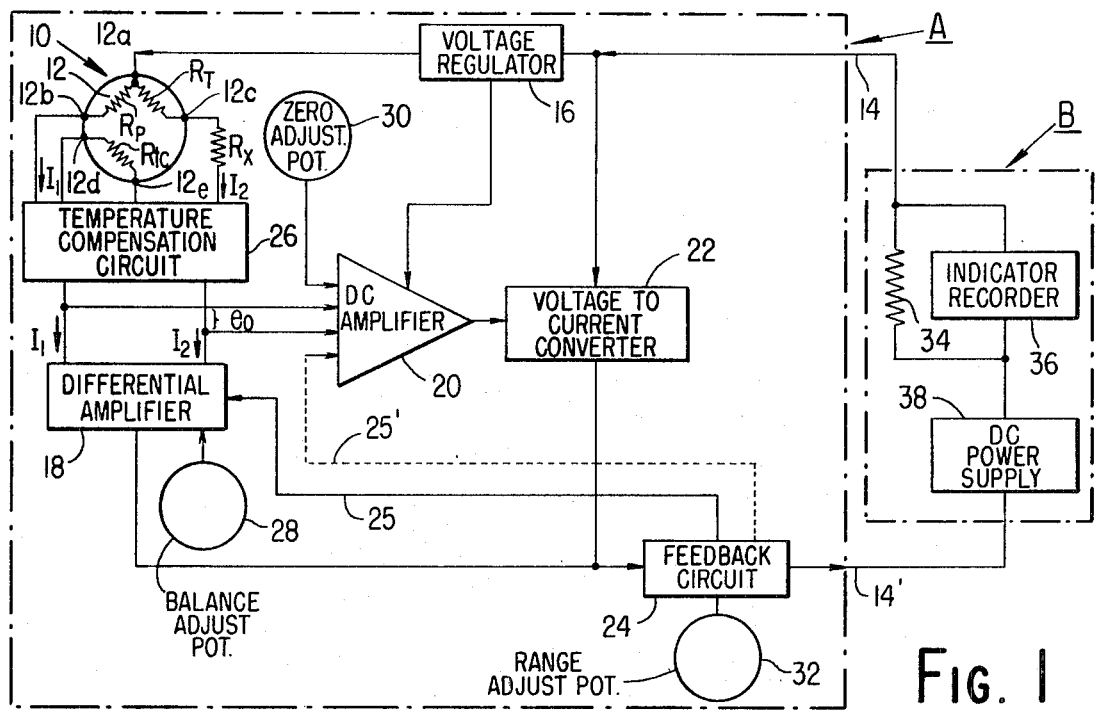
FIG. 1 is a block diagram of a transducer circuit according to the present invention.

Referring now to the drawings wherein the showings are for the purposes of illustrating the preferred embodiments of the invention only and not for the purposes of limiting same, FIG. 1 is a block diagram of a two-wire, direct-coupled transducer circuit. The transducer circuit includes a pressure transmitter station A remotely coupled to an energization and indicator station B on a pair of conductors 14, 14'. This arrangement of stations A and B allows station A to be installed out in the field where a pressure variable is located and station B is remotely located therefrom such as in remote control room.

Station A includes a suitably mounted pressure sensitive diaphragm formed from a single-crystal of one-type semiconductor material. The mounting arrangement for the diaphragm 10 may be, for example, by means of an annular supporting surface (not shown) concentric with the diaphragm 10 so as to support the peripheral surface of the diaphragm. The diaphragm 10 may be a silicon wafer of N-type semiconductor material, and as such, a two-element L-bridge of P-type semiconductor material is diffused into its unsupported central surface to form a solid-state element responsive to pressure changes applied to the diaphragm 10. The two-element bridge 12 is oriented with respect to the crystallographic direction of the diaphragm 10 so as to form a resistance $R_P$ which varies linearly with the pressure applied to the diaphragm 10 and a resistance $R_T$ which is substantially insensitive to pressure variation. The resistance bridge 12 thus has its elements $R_P$, $R_T$ arranged perpendicular to one another, and both of the elements are electrically isolated from the diaphragm by diodes laying in the plane of the diaphragm 10. The resistance $R_P$ is thus piezoresistive and the resistance $R_T$ is nonpiezoresistive corresponding to pressure sensitive and pressure insensitive resistive elements respectively. Ideally, the value of resistance of $R_P$ is equal to the value of the resistance $R_T$ when no pressure is applied to the diaphragm 10, and the temperature coefficients of these elements are substantially equal. The combination of these ideal conditions is not easily achieved, according to the present state of the art of diffusion processes, and this fact necessitates that the inequality in temperature coefficients of these elements be compensated for in order to provide accurate response indications when the temperatures of $R_P$, $R_T$ are not maintained at one constant value.

Still referring to FIG. 1, the temperature compensation circuit, block 26, is connected with the resistance bridge 12; the temperature compensating means also includes a pressure insensitive resistance $R_{tc}$, diffused into diaphragm 10, and a resistor $R_x$ which is external to the diaphragm. Specific circuit arrangements for achieving temperature compensation will be described subsequently with reference to FIGS. 2 and 3.

The resistance bridge circuit 12 is connected through the temperature compensation circuit 26 to a constant current differential amplifier 18 which functions to pass a constant current through each leg of the resistance bridge 12. The output voltage of the differential amplifier $e_o$ is zero or may be equal to zero when either no pressure or a predetermined pressure is applied to the diaphragm 10. An expression for this condition is set forth in equation (1).

$$e_o = I_1 R_P - I_2 R_T = 0 \text{ volts} \quad (1)$$

Where:

$I_1$ and $I_2$ are constant currents passing through the piezoresistor $R_P$ and resistor $R_T$, respectively;

$R_P$ is the resistance of the piezoresistor at zero applied pressure; and $R_T$ is the resistance of the associated pressure insensitive resistor.

The expression given in equation (1) is based on the assumption that the zero pressure resistance of the piezoresistor $R_P$ is substantially equal to the resistance of the pressure insensitive resistor $R_T$. When pressure is applied to the diaphragm 10, the resistance of the piezoresistor $R_P$ will incrementally change by an amount $\Delta R$, and the expression for the output voltage $e_o$ of the differential amplifier 18 is given by equation (2).

$$e_o = I_1(R_P + \Delta R) - I_2 R_T \quad (2)$$

Where:

$I_1$, $I_2$, $R_P$ and $R_T$ are the same as defined for equation (1), and $\Delta R$ is the incremental change in resistance of the piezoresistor $R_P$ which is a linear function of the pressure applied to the diaphragm.

After cancelling equal voltage terms in equation (2), this expression reduces to the form shown in equation (3). This equation shows that the output voltage $e_o$ is a direct linear function of the applied pressure since the current $I_1$ passing through the piezoresistor $R_P$ is substantially constant.

$$e_o = I_1 \Delta R \quad (3)$$

The output voltage $e_o$ from the differential amplifier 18 is applied to the input of a DC amplifier 20 which may include several stages of DC amplification for the voltage signal $e_o$. The output voltage from the DC amplifier 20 is converted to a proportional current signal output in a voltage to current converter 22. The output current signal from the voltage to current converter 22 controls the operation of a feedback circuit 24 which rebalances the differential amplifier 18 so that its output signal $e_o$ returns to zero output voltage while the output current signal in conductors 14, 14' is sustained at the value proportional to the pressure applied to the diaphragm 10. There are several alternative ways of connecting the feedback circuit 24 in order to rebalance the effect of the output signal voltage $e_o$ while maintaining the output signal current in conductors 14, 14' proportional to the pressure applied to the diaphragm 10. Two of these connections are shown generically in FIG. 1 by the connections 25 and 25'. The connection 25 from the feedback circuit 24 to the differential amplifier 18 is one of the generic alternatives which will be discussed with reference to FIG. 2, and the dashed connection 25' between the feedback circuit 24 and the DC amplifier 20 is generic to that embodiment to be discussed with reference to FIG. 3.

The output current signal on conductors 14, 14' is transmitted from the pressure transmitter station A to the remotely located energization and indicator station B. The station B includes an output load resistor 34 connected in series circuit with a DC power supply 38 so that the current in resistor 34 is the same as the current supplied from the DC power supply 38 in the conductors 14, 14'. The power supply 38 is preferably a regulated supply with the capability of providing the total output current for a plurality of pressure transmitter stations A. The total current requirements from the power supply 38 is determined by the summation of the maximum output current signals to be transmitted by all of the pressure transmitter stations A. It should be understood that the power supply 38 provides both the operating current for one or more pressure transmitter stations A as well as supplying the output signal current requirements for one or more pressure transmitter stations A.

The output signal current range for each station A is typically within a range from 4-20 ma., and it is the current magnitude passing through the resistor 34 which provides the linear output signal at station B which is indicative of the pressure applied to the diaphragm 10. Another feature of the station A is that the action of the feedback circuit 24 therewithin allows the choice of the resistance value of resistor 34 to be any value from zero up to a predetermined maximum without affecting the value of output current in conductors 14, 14'. This allows the operator to preselect the voltage input range for the recorder, while the output current range in conductors 14, 14' remains the same, merely by changing resistor 34. This action is a characteristic of the FIG. 2 and FIG. 3 embodiments, thus making the output current signal in conductors 14, 14' substantially a function of applied pressure only. An indicator recorder 36 within station B is connected in parallel across the resistor 34 to provide a voltage measurement of applied pressure. It should be understood that when using a plurality of pressure transmitter stations A, each of the stations A will be operating in parallel and each will provide an output current signal through a respective output load resistor 34. With this arrangement of plural stations A, the indicator-recorder 36 can be connected so as to sample the voltage developed across the load resistor 34 for each respective station A or a like plurality of indicator recorders 36 could be used, one recorder associated with each load resistor.

Still referring to FIG. 1, the pressure transmitter stations A also includes a voltage regulator 16 which is used to absorb the variations in voltage that would otherwise be caused by a variable output current signal in conductors 14, 14'. The regulated output voltage of the voltage regulator 16 is applied to the differential amplifier 18 by means of its input to the resistance bridge 12 at terminal 12a, and it is also applied to the DC amplifier 20 to provide an operating voltage. Also included within the pressure transmitter station A are potentiometers 28, 30, 32 or their equivalents which are used for adjusting the balance, range zero and range maximum signals respectively. A more detailed analysis of the structure and function of the adjustment potentiometers will be given with reference to FIG. 2 and 3.

EMBODIMENT OF FIG. 2

Figure 2:
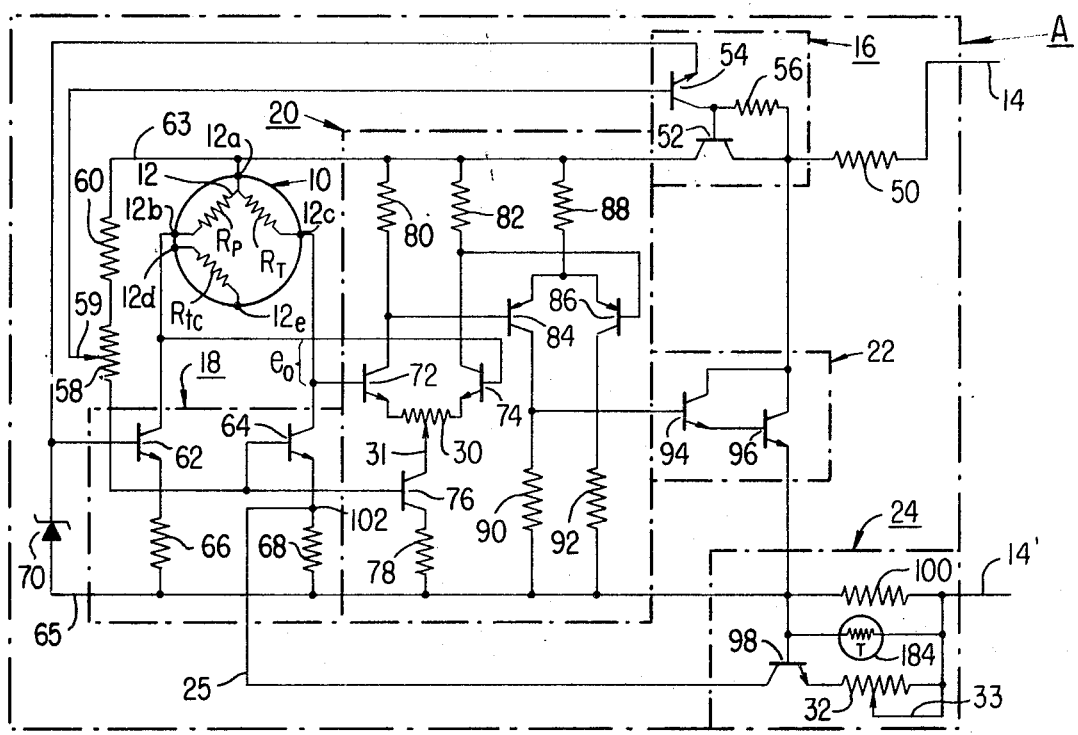
FIG. 2 is a schematic illustration of one preferred embodiment of the transmitter station portion of the transducer circuit.

Referring now to FIG. 2 illustrating one preferred embodiment of the pressure transmitter station A of FIG. 1, each of the dashed blocks enclose a plurality of electrical elements, connected in circuit, to provide the functions represented within the correspondingly numbered blocks as shown in FIG. 1. The temperature compensation circuit 26 is not designated in this fashion but does include a zener diode 70 connected in circuit with the other elements shown in FIG. 2.

The resistance bridge 12, including piezoresistor $R_P$ and resistor $R_T$, is diffused into a pressure sensitive silicon wafer 19 and is connected at a corner terminal 12a and outer terminals 12b, 12c suitable for making electrical contact with the remainder of the circuit. The constant current differential amplifier 18 includes a pair of NPN-transistors 62, 64 arranged to pass constant and equal currents through resistors $R_P$, $R_T$ respectively. The collector terminal of transistor 62 is connected to terminal 12b, and its emitter terminal is connected through a current limiting resistor 66 to a conductor 65. Transistor 64 is connected in a similar arrangement with its collector terminal connected to the bridge terminal 12c and its emitter terminal connected through a current limiting resistor 68 to conductor 65.

The operating voltage for the bridge 12 and the differential amplifier 18 is supplied between conductors 63 and 65 through a series voltage regulating transistor 52 included within the voltage regulator block 16. Block 16 also includes a control transistor 54, and both transistors 52, 54 are of the NPN-type. It should be understood that even though all of the transistors shown within the pressure transmitter station A of FIG. 2 are of the NPN-type, PNP-type transistors could with appropriate changes, also be used, as would be evident to one skilled in the art.

As shown in FIG. 2 the collector terminal of transistor 54 is connected to the base terminal of transistor 52 and is also connected through a biasing resistor 56 to the collector terminal of transistor 52. The emitter terminal of transistor 54 is connected to the base terminal of transistor 62 which is also connected through a potentiometer 58 and a biasing resistor 60 to conductor 63. The potentiometer 58 has a movable contact arm 59 which is connected to the base terminal of control transistor 54 in order to base bias the series voltage regulating transistor 52 into a state of conduction. The level of conduction of transistor 52 is adjusted with the movement of contact arm 59 of potentiometer 58 to provide operating current for the circuit even with no pressure applied to the diaphragm 10. A precision resistor 50 is interposed between the collector terminal of transistor 52 and conductor 14 to the remote station B in order to provide remote calibration of the pressure transmitter station A while in the field where it is located. The voltage across resistor 50 can be precisely measured and, with a known resistance value of resistor 50, the current in conductors 14, 14' can be easily calculated with the use of Ohm's Law. Circuit excitation current and linearity of the output current signal with pressure applied to diaphragm 10 can be determined by this method of measurement.

Another element included in the circuit to bias the circuit into operation is a zener diode 70 connected between the base terminal of transistors 62, 64 and conductor 65. The zener diode 70 has a positive polarity temperature coefficient with respect to the negative temperature coefficient of the resistance $\Delta R$ for the diffused resistor $R_P$. Unequal positive polarity temperature coefficients for $R_P$ and $R_T$ are thus compensated by the inclusion of this zener diode 70 so as to provide range compensation for a change in temperature. Temperature compensation of the resistors $R_P$ and $R_T$ can also be facilitated by diffusing a third resistor $R_{tc}$ into the surface of the pressure sensitive silicon wafer 10 so as to be pressure insensitive like $R_T$ and having a temperature coefficient of the same polarity as the temperature coefficients of $R_P$ and $R_T$. The inclusion of $R_{tc}$ will be further described with reference to the embodiment of FIG. 3, and it is important to realize that this temperature compensating means can be used with equal facility in the embodiment of FIG. 2; it is within the skill of one in the art to do so. Another temperature compensating element included within the circuit of FIG. 2 is a thermistor 184, connected across resistor 100, which coacts with zener diode 70 to provide range compensation.

The DC amplifier 20 comprises a first stage differential amplifier including transistors 72, 74 and a second stage differential amplifier including transistors 84, 86. These two stages of differential voltage amplification are used to amplify the voltage output between terminals 12b and 12c of the resistance bridge 12. A current regulating transistor 76 is connected in series with the collector-emitter junctions of transistors 72, 74 through the movable contact arm 31 of a zero adjustment potentiometer 30. The transistor 76 has its emitter terminal connected through a bias resistor 78 to conductor 65, and the base terminal of transistor 76 is connected in common with the base terminal of transistors 62, 64 across the zener diode 70. A collector load resistor 80 is connected between the collector terminal of transistor 72 and conductor 63, and a like resistor 82 is connected between the collector terminal of transistor 74 and conductor 63. Terminal 12b is connected to the base terminal of transistor 74, and terminal 12c is connected to the base terminal of transistor 72 in order to provide voltage amplification of the signal $e_o$ therebetween as generated at the collector terminals of transistors 72, 74. The second stage of differential amplification is provided by transistors 84, 86 with their associated collector load resistors 90, 92 and a common emitter bias resistor 88. A single-ended output voltage is connected from the collector terminal of transistor 84 into the voltage to current converter 22.

The voltage to current converter 22 includes a pair of transistors 94, 96 connected in a high gain voltage to current converter (Darlington connection). The collector terminals of transistors 94, 96 and 52 are connected in common, and the emitter terminal of transistor 94 is connected to control the base terminal of transistor 96. The emitter terminal of transistor 96 is connected to conductor 14' through a resistor 100 included within the feedback circuit 24. The operation of transistor 96 is such as to regulate the output current signal flowing through conductors 14, 14' in direct response to the amplified output voltage applied to the base terminal of transistor 94 caused by a change in pressure applied to the diaphragm 10.

The feedback circuit 24 includes a feedback transistor 98 having its base terminal connected to the emitter terminal of transistor 96 and having its emitter terminal connected through a range adjustment potentiometer 32 to conductor 14'. It should now be understood that resistor 100 provides a bias voltage between the base and emitter terminals of transistor 98. This bias voltage is proportional to the output current signal flowing through conductors 14, 14'. Transistor 98 is thus biased so as to increase its state of conduction in proportion to the increase in output current signal flowing through conductors 14, 14'. Utiliizing this biasing function in rebalancing the voltage output of the differential amplifier 18 is accomplished by the feedback connection 25 between the collector terminal of transistor 98 and the emitter terminal of transistor 64 at point 102. It should be understood that the circuit within block 24 is a high impedance feedback circuit which responds to the voltage across resistor 100 from the change in output current flow in conductors 14, 14' resulting from a bridge unbalance. The feedback transistor 98 regulates the current flow through its collector-emitter junction to regulate the current flow through $R_T$ until the voltage level at terminal 12c approaches the voltage level at terminal 12b, and the output voltage $e_o$ of the constant current differential amplifier 18 is essentially unbalanced.

The specific connection of the feedback circuit 24 shown in FIG. 2 merely represents one of several connections which could be utilized. One skilled in the art would realize that the feedback circuit 24 could be interposed along conductor 14 so as to be in electrical series with resistor 50, and the feedback connection 25 would then be connected to the emitter terminal of transistor 62 so as to control the current flow through resistor $R_P$. A PNP-transistor replaces transistor 98 in this configuration. It should also be evident that a dual feedback circuit, incorporating the arrangement shown in FIG. 2 together with the hereinabove described arrangement, could be used to control the current flow through both the resistors $R_T$ and $R_P$ in order to rebalance the voltage output $e_o$ to a value of zero volts while sustaining the output current signal in conductors 14, 14' at the value proportional to the applied pressure.

Along with the adjustability provided by the inclusion of potentiometer 58 for initially energizing the circuit and the inclusion of resistor 50 for calibrating the output current signal, potentiometers 30 and 33 are also provided for adjustment purposes. Potentiometer 30 is provided for two purposes, the first of which is that when zero pressure is applied to the diaphragm 10, the potentiometer 30 is adjusted to establish a slight unbalance in the amplifier input circuit to produce a voltage signal of sufficient magnitude to maintain the pressure transmitter circuit active. By maintaining the pressure transmitter circuit active, smooth, rapid circuit response to bridge unbalance caused by pressure changes is assured. The second purpose for potentiometer 30 is to provide circuit zero pressure suppression capability so that a predetermined output signal current will flow in conductors 14, 14' when the pressure applied to the diaphragm 10 is other than zero. This capability permits the allocation of the total output current signal range to represent a preselected portion of the input pressure range. The range adjustment potentiometer 32, as its name implies, is provided to adjust the output signal current in conductors 14, 14' to a predetermined maximum when a maximum pressure is applied to the diaphragm 10. The potentiometers 30 and 32, as shown and described in FIG. 2, interact to provide the functions of balancing, zeroing and range adjusting. These adjustment features are also provided in the embodiment shown in FIG. 3 and will subsequently be described with reference thereto.

EMBODIMENT OF FIG. 3

Figure 3:
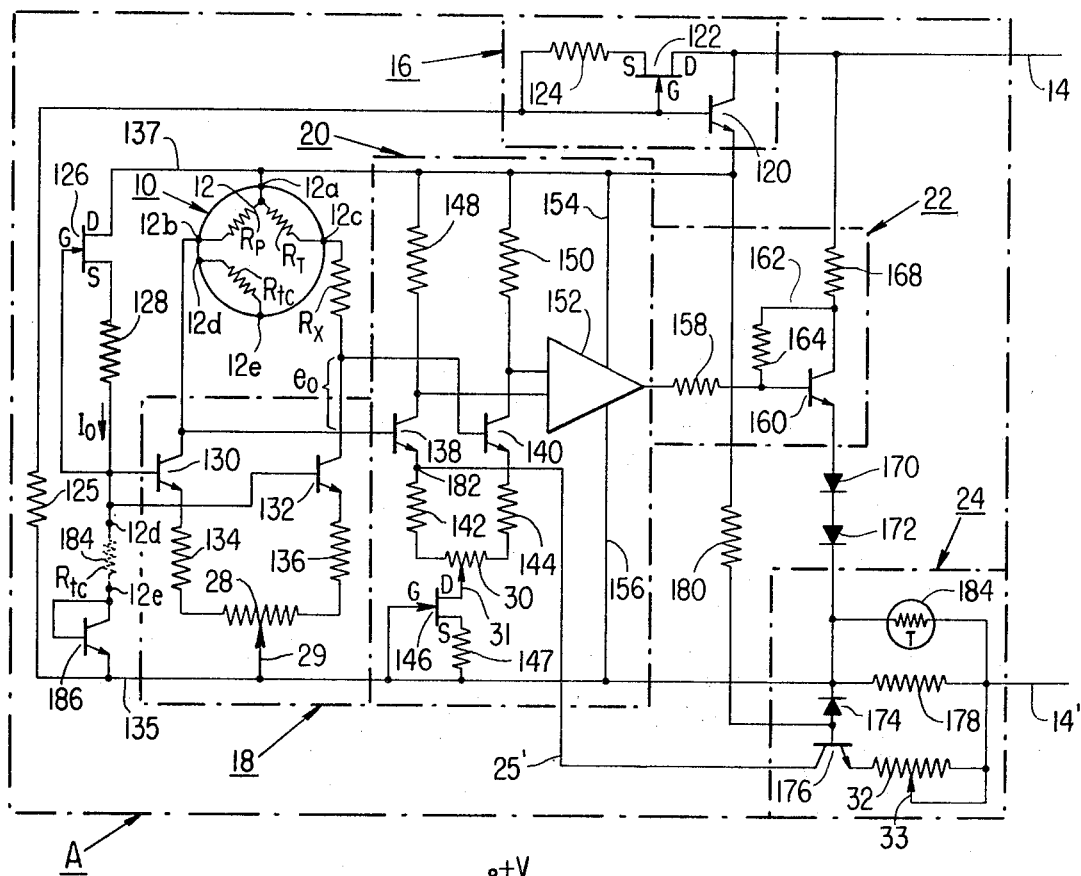
FIG. 3 is a schematic illustration of another preferred embodiment of the transmitter station portion of the transducer circuit.

Referring now to FIG. 3 illustrating another preferred embodiment of the pressure transmitter station A of FIG. 1, each of the dashed blocks enclose a plurality of electrical elements, connected in circuit, to provide the functions represented within the correspondingly numbered blocks as shown in FIG. 1. The temperature compensation circuit 26 is not designated in this fashion but does not include resistors $R_{tc}$ and $R_x$ connected in circuit with the other elements shown in FIG. 3, to be described subsequently.

The constant current differential amplifier 18 includes a pair of NPN-transistors 130, 132 in an arrangement similar to that shown in FIG. 2, in order to pass constant and equal currents through resistors $R_P$, $R_T$ respectively. An important distinction over the circuit arrangement shown in FIG. 2 is that a balance adjustment potentiometer 28 is connected between a pair of emitter bias resistors 134, 136 for the respective transistors 130, 132. The movable contact arm 29 of potentiometer 28 is connected to conductor 135, and the collector terminals of transistors 130, 132 are respectively connected to the outer terminals of the bridge 12 at 12b, 12c with the corner terminal of the bridge 12a connected to conductor 137. The balance potentiometer 28 is a null adjustment means used for balancing the differential amplifier currents flowing through $R_P$ and $R_T$. The potentiometer 28 performs a dual function in the circuit in that it adjusts the output voltage $e_o$ between terminals 12b and 12c to zero with a zero-based pressure applied to diaphragm 10, and it is also used to adjust $e_o$ to zero volts when operating with a suppressed pressure range such as when the minimum pressure applied to the diaphragm 10 is other than zero.

The operating voltage for the bridge 12 and the differential amplifier 18 is applied between conductors 135 and 137 from the emitter terminal of a series voltage regulating transistor 120. The collector terminal of transistor 120 is connected to conductor 14, and its base terminal is connected to conductor 135 through a biasing resistor 125. The voltage regulator 16 also includes a field effect transistor (hereinafter referred to as FET) having source, drain and gate terminals designated S, D and G respectively. The FET 122 has its drain terminal connected to the collector terminal of transistor 120 and has its gate terminal connected to the base terminal of transistor 120. The source terminal of FET 122 is connected through a source resistor 124 to the base terminal of transistor 120. The FET 122 is an N-channel type FET which means that it normally operates with its drain terminal maintained positive with respect to its source terminal and its gate terminal more negative than its source terminal. The source resistor 124 is selected so that FET 122 will generate a constant DC current through its drain-source junction, and the constant current will flow through the resistor 125 to provide a preselected voltage at the base terminal of transistor 120. The voltage at the emitter terminal of the regulating transistor 120 is the regulated supply voltage for the constant current differential amplifier 18 and the DC amplifier 20 because transistor 120 absorbs the variations in operating voltage that would otherwise result.

An N-channel FET 126 has its drain terminal connected to conductor 137 and its source terminal connected through a source resistor 128 to the base terminal of transistor 130. The gate terminal of FET 126 is connected to the base terminal of transistor 130 along with one terminal 12d of the temperature compensating resistor $R_{tc}$ which is diffused in diaphragm 10. The remaining terminal 12e of $R_{tc}$ is connected to both the base and collector terminals of a transistor 186 which has its emitter terminal connected to conductor 135. The transistor 186 is thus connected as a diode as described above and its function will be explained along with the function of $R_{tc}$ in the description under

TEMPERATURE COMPENSATION.

The circuit arrangement for FET 126 is such that it will generate a constant current through its drain source junction and through resistors 128, 184 and transistor 186 to provide a properly compensated voltage at the base terminals of transistors 130, 132 based on the temperature dependent value of $R_{tc}$. As a result of the voltage applied to the base terminals of transistors 130, 132, constant currents will flow through the bridge legs $R_P$, $R_T$ respectively, and the output voltage $e_o$ can be adjusted to zero volts by means of the balance potentiometer 28. Equation (3), as derived with reference to FIG. 1, is also applicable to characterize the output voltage $e_o$.

The output voltage $e_o$ between the collector terminals of transistors 130, 132 is applied to the base terminals of a pair of first stage differential amplifier transistors 138, 140, which are included with the DC amplifier 20. An emitter bias resistor 142 for transistor 138 and a similar resistor 144 for transistor 140 are connected in series with a zero adjustment potentiometer 30 having a movable contact arm 31. The movable contact arm 31 is connected to the drain terminal of an N-channel type FET which has its source terminal connected through a source resistor 147 to conductor 135. The gate terminal of FET 146 is also connected to conductor 135, and collector load resistors 148, 150 are connected between the respective collector terminals of transistors 138, 140 and conductor 137 to complete the circuit arrangement for the first stage of differential amplification. The circuit arrangement for the FET 146 includes the selection of a source resistor 147 to enable FET 146 to function as a constant current generator for transistors 138, 140. The zero adjustment potentiometer 30 adjusts the output current signal in conductors 14, 14' to a preselected value after the balance adjustment potentiometer 28 sets the voltage $e_o$ to zero volts either operating with or without a suppressed pressure range as earlier stated. The differential pair of transistors 138, 140 also serve as a buffer or isolating stage between the constant current differential amplifier, block 18, and the second stage of DC amplification within block 20.

The second stage of differential amplification 20 is provided by connecting the collector terminals of transistors 138, 140 to the input terminals of an operational amplifier 152. The operating voltage for the operational amplifier 152 is provided by a connection 154 to the regulated voltage on conductor 137 and a connection 156 to conductor 135. The operational amplifier 152 provides additional DC amplification while operating at a very small bias current.

The output voltage from operational amplifier 152 is connected through a resistor 158 to the base of a voltage to current converting transistor 160 included within block 22. The voltage to current converter 22 also includes a resistor 164 connected in series with a capacitor 162 between the base and collector terminals of transistor 160. A current limiting resistor 168 is connected between the collector terminal of transistor 160 and conductor 14. A pair of diodes 170, 172 are connected in series between the emitter terminal of transistor 160 and conductor 135 so that the anode of diode 170 is connected to the emitter terminal and the cathode of diode 172 is connected to conductor 135. These diodes are provided for biasing the emitter terminal of transistor 160 with respect to its base terminal to set a higher operating condition.

The feedback circuit 24 includes a diode 174 having its cathode connected to conductor 135 and its anode connected to the base terminal of a feedback transistor 176. Diode 174 is provided for enhanced range temperature compensation. A thermistor 184, connected across resistor 178, also compensates the range characteristics.

A bias resistor 178 for transistor 176 is connected between the cathode terminal of diode 174 and remote conductor 14', the bias arrangement being completed by a range adjustment potentiometer 32 connected between conductor 14' and the emitter terminal of transistor 176. A resistor 180 is connected between conductor 137 and the base terminal of transistor 176 to provide a regulated bias voltage at the base of this transistor. A feedback connection 25' is made between the collector terminal of transistor 176 and the emitter terminal of transistor 138 at point 182 for the purpose of rebalancing the voltage output between the collector terminals of transistors 138, 140 while sustaining the output current signal in conductors 14, 14' at the value proportional to the pressure applied to the diaphragm 10.

The output voltage from the operational amplifier 152 is applied to the base terminal of transistor 160 with a phasing such that the base will be driven more positive for an increase in the piezoresistance change ΔR corresponding to an increase in applied pressure. As the base of the transistor 160 goes more positive, the current through the collector-emitter junction of transistor 160 will increase, and this increase in current will flow through bias resistor 178 and through conductors 14, 14' to the remote station B to provide a linearly proportional output indication. The proportional increase in voltage across the bias resistor 178 drives the base of transistor 176 more positive to cause it to conduct more current through its collector-emitter junction. As a result, transistor 176 draws more current through transistor 138 until the voltage on the collector terminal of transistor 138 returns to the voltage that it sustained before the pressure change. In this manner, the transmitter circuit is rebalanced, and a linear incremental change in output current signal in conductors 14, 14' has been achieved for a change in pressure applied to diaphragm 10.

The range adjustment potentiometer 32, having a movable contact arm 33, adjusts the output current signal in conductors 14, 14' to a predetermined maximum value with a maximum pressure applied to the diaphragm 10. This adjustment varies the amount of feedback in the circuit thus providing the flexibility of a turndown ratio typically within the range of 5 to 1. There is an interaction between the range adjustment potentiometer 32 and the zero adjustment potentiometer 30, the latter potentiometer provides for adjusting the output current signal to a minimum value for a minimum applied pressure. It is, therefore, advisable when calibrating the transmitter station A to a specific pressure range, to cycle the transmitter between the minimum and maximum applied pressure in order to obtain the predetermined minimum to maximum output current signals.

The specific connection of the feedback circuit 24 shown in FIG. 3 merely represents one of several connections which could be utilized. The feedback circuit 24 could be interposed along conductor 14, with a PNP transistor replacing transistor 176, and the feedback connection 25' would then be connected to the emitter terminal of transistor 140. With this arrangement current would be injected into transistor 140 until its collector terminal returns to the value of voltage thereon before the change in pressure. It should also be evident to one skilled in the art that a dual feedback circuit, incorporating the arrangement shown in FIG. 3 together with the hereinabove described arrangement, could be used to control the current flow through both the transistors 138, 140 in order to rebalance the voltage output between their collector terminals to a value of zero volts while sustaining the output current signal in conductors 14, 14' at the value proportional to the applied pressure.

TEMPERATURE COMPENSATION

Referring again to FIG. 1, the temperature compensation circuit 26 is included in the pressure transmitter station A for the purpose of substantially obviating the effects of environmental and localized temperature gradients. The interposition of the temperature compensation circuit 26 between the resistance bridge 12 and the differential amplifier 18 in FIG. 1 is not to be construed as limiting in that all temperature compensation elements may not be confined to this physical location within the circuit. A temperature compensating resistor $R_{tc}$ of the same type semiconductor material as $R_P$ and $R_T$ is diffused into the surface of the diaphragm 10. The resistor $R_{tc}$ lays in the plane of the diaphragm 10 and is oriented with respect to the crystallographic direction of the diaphragm 10 so that it is nonpiezoresistive corresponding to a pressure insensitive resistive element. The temperature compensating resistor $R_{tc}$, like the resistors $R_T$ and $R_P$, is temperature sensitive, and the temperature sensitivity is specified by a temperature coefficient $K_{tc}$ having a resistance characteristic which increases for increasing temperature within a predetermined temperature range.

Temperature compensation in the pressure transmitter station A can be analyzed in terms of temperature dependencies of the diffused resistors resulting in temperature coefficient zero shift, amplifier zero shift with temperature and range shift with temperature. The first of these effects, i.e., temperature coefficient zero shift, results from the inequality in temperature coefficients of the diffused resistors $R_P$ and $R_T$ since the state of the art of diffusion processes is not so advanced at the present time as to insure that these temperature coefficients will be matched with exacting precision at a reasonable cost.

The method and apparatus for temperature compensation illustrated in FIG. 3 may be used with equal facility in the circuit of FIG. 2, and the discussion of temperature compensation which follows applies to both FIGS. 2 and 3 although the description will be made with respect to FIGS. 3 and 3a. The showing in FIG. 3a includes the major portion of the temperature compensating arrangement in FIG. 3, and it has been introduced in order to more clearly show the interrelationship of the temperature compensating elements. The arrangement shown in FIG. 3a includes an incremental resistor ΔR in series with the piezoresistor $R_P$ so as to represent the incremental change in resistance of the piezoresistor $R_P$ which is a linear function of the pressure applied to the diaphragm 10. The symbol +V represents the positive DC voltage applied to the resistance bridge 12 at terminal 12a. The constant current generated through the drain-source junction of FET 126 in FIG. 3 has been equivalently represented by a directional current source $I_o$ in FIG. 3a. The remaining elements of the arrangement of FIG. 3a have been correspondingly numbered to those same elements in FIG. 3 as well as being symbolically designated for purposes of simplifying the equations which follow.

Figure 3A:
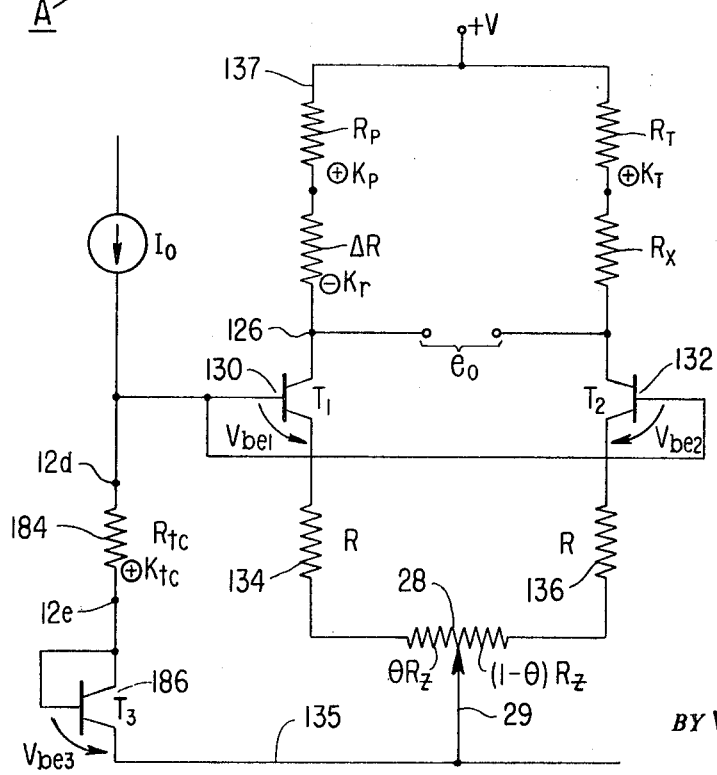
FIG. 3a is a schematic illustration of a portion of the temperature compensation means as included within FIG. 3.

An expression for the output voltage $e_o$ between the collector terminals of transistors $T_1$ and $T_2$ in terms of a simplified but appropriate voltage analysis of FIG. 3a is set forth in equation (4).

$$e_o = \alpha_2 R_T \left[ \frac{I_o R_{tc} + V_{be3} - V_{be2}}{R + (1-\theta)R_z} \right] - \alpha_1 (R_P + \Delta R) \left[ \frac{I_o R_{tc} + V_{be3} - V_{be1}}{R + \theta R_z} \right] \quad (4)$$

Where:

$\alpha_1$ and $\alpha_2$ are the current gains of transistors $T_1$ and $T_2$ respectively;

$V_{be1}$, $V_{be2}$ and $V_{be3}$ are the base to emitter voltage drops of transistors $T_1$, $T_2$ and $T_3$ respectively;

$R$ is the value of the emitter bias resistors 134 and 136 which typically are equal;

$\phi R_z$ is that portion of the potentiometer resistance 28 having a total resistance value of $R_z$ in series with resistor 134, with $\phi$ being a fractional multiplying factor;

$(1-\phi)R_z$ is the remaining portion of potentiometer resistor $R_z$ which is in series with resistor 136; and, the remaining terms in equation (4) correspond to those elements previously defined.

One of the principal elements included within the circuit arrangement of FIG. 3 and also shown in FIG. 3a is the resistor $R_x$, external to the silicon sensing elements, having a temperature coefficient $K_x$. $R_x$ is shown to be in series circuit connection with the pressure insensitive resistor $R_T$ in the collector circuit of transistor $T_2$. This element has been purposely omitted from equation (4) for the reason that equation (4) is generic to the circuit arrangement where resistor $R_x$ is either connected in series with resistor $R_T$ in the collector circuit of transistor $T_2$, as shown, or alternatively connected in series with the piezoresistor $R_P$ in the collector circuit of transistor $T_1$. The determination of whether the temperature compensating resistor $R_x$ is to be included within one or the other of the collector circuits is based on a determination of which of the two diffused resistors $R_P$ and $R_T$ has the greater temperature coefficient with respect to the other. In the first case, where the temperature coefficient $K_T$ of resistor $R_T$ is greater than the temperature coefficient $K_P$ of piezoresistor $R_P$, the temperature compensating resistor $R_x$ is connected in series with the resistor $R_T$ in the collector circuit of transistor $T_2$. In the second case, where the temperature coefficient $K_P$ is greater than the temperature coefficient $K_T$, the temperature compensating resistor $R_x$ is connected in series with piezoresistor $R_P$ in the collector circuit of transistor $T_1$.

Further considering the first case where $K_T$ is greater than $K_P$, the resistor $R_x$ is properly connected as shown in FIGS. 1, 3 and 3a. In order to simplify the explanation of the temperature effects of the extremely temperature sensitive silicon sensor, certain underlying assumptions are made. These assumptions are designated (a), (b) and (c) as given below.

$\Delta R = 0$ (at zero applied pressure)     (a)
$\Delta \alpha_1 / \Delta T = \Delta \alpha_2 / \Delta T$     (b)
$\Delta V_{be1}/\Delta T = \Delta V_{be2}/\Delta T = \Delta V_{be3}/\Delta T$     (c)

Assumption (a) simply means that the incremental change in resistance of the piezoresistor $R_P$ is zero at zero pressure applied to the diaphragm 10. This is physically realizable with relative ease since this resistance change is a linear function of the pressure applied to the diaphragm. The assumption (b) states that the change in current gain of transistor $T_1$ for a corresponding change in temperature $\Delta T$ is equal to the change in current gain of transistor $T_2$ for the same change in temperature $\Delta T$. The assumption (c) states that the change in base to emitter voltage drop of each of the transistors $T_1$, $T_2$ and $t_3$ is equal when ratioed with the corresponding change in temperature $\Delta T$. The assumptions (b) and (c) cannot be physically realized with mathematical precision, but these assumptive limits can be approached by matching transistors $T_1$, $T_2$ and $T_3$ with respect to their response characteristics to the degree which is possible. This may be done by utilizing an integrated circuit package including three matched transistors so as to minimize the effects of thermal gradients on the transistor parameters.

Now assuming that (a), (b) and (c) are substantially true, equation (4) will be reduced to the expression given in equation (5).

$$e_o = I_o R_{tc} \left[ \frac{R_T}{R + (1-\theta)R_z} - \frac{R_P}{R + \theta R_z} \right] = 0$$

Equation (5) represents a reference temperature condition since no term has been included to represent the effects of the temperature coefficients $K_P$, $K_T$ and $K_{tc}$ for the resistors $R_P$, $R_T$ and $R_{tc}$ respectively. With an adjustment of the movable contact arm 29 of the balance potentiometer 28, the output voltage $e_o$ can be set equal to zero volts as expressed in equation (5).

Under the same assumptions as used to provide equation (5), but at an elevated temperature where the effects of the temperature coefficients of resistors $R_P$, $R_T$ and $R_{tc}$ become appreciable, equation (4) reduces to equation (6).

$$e_o = I_o R_{tc}(1+K_{tc}) \left[ \frac{R_T(1+K_T)}{R + (1-\theta)R_z} - \frac{R_P(1+K_P)}{R + \theta R_z} \right] \quad (6)$$

Now, considering the modification of equations (5) and (6) by the inclusion of the temperature compensating resistor $R_x$ as shown in FIG. 3a, the respective equations (7) and (8) result.

$$I_o R_{tc} \left[ \frac{R_T + R_x}{R + (1-\theta)R_z} - \frac{R_P}{R + \theta R_z} \right] = 0 \quad (7)$$

$$I_o R_{tc}(1+K_{tc}) \left[ \frac{R_T(1+K_T) + R_x}{R + (1-\theta)R_z} - \frac{R_P(1+K_P)}{R + \theta R_z} \right] = 0 \quad (8)$$

Equation (8) is forced to be zero in the analysis since it may be proved that the inclusion of temperature compensating resistor $R_x$ in the circuit will eliminated that portion of the output voltage $e_o$ which is attributable to the change in temperature $\Delta T$ from the reference temperature. It should be clear that the inclusion of resistor $R_x$ in the circuit, under reference temperature conditions as expressed by equation (7), necessitates the readjustment of potentiometer 28 so as to provide a zero output voltage $e_o$ as expressed by equation (7).

Equations (7) and (8) may be simplified by dividing each equation by the common multiplying terms in each equation and transposing the term, preceded by a minus sign in each equation, to the right of the equal sign so as to form two pair of equalities. Then taking the ratio of the terms to the right of the equal sign of equations (7) and (8) and doing the same for the terms to the left of the equal sign in these two equations, equation (9) results.

$$\frac{R_T + R_x}{R_T(1+K_T) + R_x} = \frac{R_P}{R_P(1+K_P)} \quad (9)$$

Solving for $R_x$ provides equation (10) which may be used for finding the value of resistance necessary to substantially eliminate the zero coefficient shift effects of a temperature change $\Delta T$. This is done by substituting the known or measured values for the parameters $R_T$, $K_T$ and $K_P$.

$$R_x = \frac{R_T(K_T - 1)}{K_P} \quad (10)$$

It should be understood that the calculation of $R_x$ in the above fashion has been made with the underlying assumptions (a), (b) and (c). Since it is recognized that these assumptions are idealized and are not all physically realizable per se, the value of resistor $R_x$ according to equation (10) is also only an approximation. This value, however, does not provide an important first value for resistor $R_x$, and it is to be understood that it may be necessary to increase or decrease this value based on empirical measurements in order to choose the final value of $R_x$ which will provide optimum results. Since the resistor $R_x$ is not diffused into the diaphragm 10, but is located proximate thereto, this resistor can be of the conventional wire wound or metal film variety and may be provided with some means of temperature shielding although it is not critical to do so since the resistor $R_x$ is substantially temperature insensitive relative to the ultra sensitive temperature sensitivity of the diffused resistors $R_P$, $R_T$ and $R_{tc}$.

The above analysis has been directed to the temperature dependencies of the diffused resistors and the method of temperature compensation therefor. This method of analysis is also applicable to compensation for amplifier zero shift. A resistor $R_x$ can be used to compensate in the proper direction for this zero shift. It should be understood that the value of $R_x$ determined by the amplifier zero shift analysis can be lumped with the value of $R_x$ needed for the compensation of the particular diffused resistors, so that the resistance value of $R_x$ in FIGS. 3 and 3a is accordingly increased or decreased.

Since the above method of analysis is applicable to both types of zero shift compensation, it should also be understood that if the resistor $R_x$ is to be included in series connection with piezoresistor $R_P$ in the collector circuit of transistor $T_1$, then this value of resistance will also have to be selected accordingly. The development of a final equation for the condition in which $K_P$ is greater than $K_T$ proceeds in the same fashion as for the resulting equation (10) starting with equations (5) and (6); the only significant difference is that the sum ($R_x$ and $R_P$) is substituted for $R_P$ in both the equation for the reference temperature condition and the equation for the elevated temperature condition. The value of $R_x$ is not affected by the temperature coefficient $K_P$ in the equation for the elevated temperature condition. Following this analysis will result in equation (11) in terms of $R_P$, $K_P$ and $K_T$.

$$R_x = \frac{R_P(K_P - 1)}{K_T} \quad (11)$$

The temperature compensation for range shift which is provided in the circuits of FIGS. 3 and 3a can by analyzed in a similar fashion starting with equation (4) and ignoring all but those terms in the equation which are factored with the incremental change in resistance $\Delta R$ of the piezoresistor $R_P$. Equation (4) thus reduces to the form shown in equation (12) with the terms of the equation (12) as defined earlier.

$$e_o = \alpha_1 \Delta R \left[ \frac{I_o R_{tc} + V_{be3} - V_{be1}}{R + \theta R_z} \right] \quad (12)$$

It can be seen from equation (12) that the output voltage $e_o$ is dependent upon the base emitter voltage $V_{be1}$ of transistor $T_1$ as well as the base to emitter voltage $V_{be3}$ of transistor $T_3$. It is for this reason that transistor $T_3$ has been connected in the circuit as shown, effectively acting as a diode, so that the voltage $V_{be3}$ tends to cancel the voltage $V_{be1}$ provided that the transistors $T_1$ and $T_3$ are substantially matched, and the effects of thermal gradients on the transistor parameters are minimized. The base to emitter voltages of transistors $T_1$ and $T_3$ therefore "track" with each other so as to undergo a substantially equal change in magnitude in reaching any given temperature. If transistor $T_3$ were not provided in this connection, the output voltage $e_o$ would be a function of the change in the voltage $V_{be1}$ with temperature and range shift temperature compensation would not be achieved to the degree herewith possible.

Repeating assumption (c) from the previous development which states that the base to emitter voltage of transistors $T_1$ and $T_3$ change equally with respect to a temperature change, and further assuming that the current gain of transistor $T_1$ is equal to unity, equation (12) reduces to equation (13) for a reference temperature condition.

$$e_o = \Delta R \left[ \frac{I_o R_{tc}}{R + \theta R_z} \right] \quad (13)$$

Under the same assumptions resulting in equation (13), equation (12) results in equation (14) at an elevated temperature condition.

$$e_o = \Delta R (1 - K_r) \left[ \frac{I_o R_{tc}}{R + \theta R_z} \right] (1 + K_{tc}) \quad (14)$$

Where:

$(1-K_r)$ accounts for the effect of elevated temperature on the $\Delta R$ resistance of the piezoresistor $R_P$ having a temperature coefficient $K_r$, and $(1+K_{tc})$ accounts for the effect of elevated temperature on the temperature compensating resistor $R_{tc}$ having a temperature coefficient $k_{tc}$.

It should be noted at this point that the sign of the temperature coefficient $K_r$ for the $\Delta R$ term is negative corresponding to a resistance characteristic which decreases for increasing values of temperature. This should be contrasted with increasing resistance for increasing temperature characteristic of resistors $R_P$, $R_T$ and $R_{tc}$. This temperature characteristic for each of the resistors is taken into consideration by the polarity sign associated with each of the temperature coefficients, and it is precisely this polarity characteristic of $R_{tc}$ which introduces compensation of range shift with temperature by the inclusion of the resistor $R_{tc}$ in the circuit as shown. The base of transistor is thereby driven more positive for increasing temperatures resulting in a compensating action to offset the effect of the negative temperature coefficient of $\Delta R$.

Equating the expressions given in equations (13) and (14) provides an expression for the required temperature coefficient $K_{tc}$ in terms of temperature coefficient $K_r$ as given in equation (15).

$$K_{tc} = \frac{K_r}{1 - K_r} \quad (15)$$

Assuming in the above equation that the temperature coefficient $K_r$ is much less than unity, as it is possible to control the diffusion of piezoresistor $R_P$ so as to provide such a temperature coefficient characteristic for the resistance $\Delta R$, the temperature coefficient $K_{tc}$ should be made equal to the magnitude of the temperature coefficient $K_r$ in order to have no range shift with a temperature change. This matching of temperature coefficients is an exacting process in the diffusion art, and only an approximate matching of these temperature coefficients results in actual practice. While this approximation does not provide full temperature compensation of the range shift, it does provide a degree of compensation which would not otherwise be accomplished. In order to additionally compensate the range shift, thermistor compensation is used to increase the gain of the constant current differential amplifier 18. Thermistor compensation can be effectuated by connecting a thermistor 184 between the cathode of diode 174 and conductor 14' in FIG. 3 and this effect can also be achieved by connecting the thermistor 184 between the base of transistor 98 and conductor 14' in FIG. 2 so as to be included within the feedback circuit 24 in each circuit. Thermistor compensation will also provide the compensating effect when the feedback circuit 24 is connected in any of the other arrangements described hereinbefore. The diode 174 in feedback circuit 24, likewise enhances range compensation accordingly.

The invention has been described with reference to the preferred embodiments. Obviously modifications and alterations will occur to others upon the reading and understanding of this specification. It is our intention to include all such modifications and alterations insofar as they come within the scope of the appended claims or the equivalence thereof.

We claim:

1. A transducer circuit for converting the pressure applied to a diaphragm of one type semiconductor material into a linear proportional electrical output signal, comprising:

a resistance bridge having a corner and two outer ends and including, a piezoresistor of the opposite type semiconductor material diffused into the diaphragm, said piezoresistor having a resistance characteristic which varies linearly with the applied pressure;

a second resistor, of the same type semiconductor material as said piezoresistor, diffused into the diaphragm so as to have a resistance value which is substantially insensitive to pressure variation, said piezoresistor and said second resistor being connected to form the corner of said bridge;

circuit means, connected between the corner and outer ends of said bridge, for amplifying the difference signal which is generated between the outer ends of said bridge when pressure is applied to the diaphragm and for proportionally changing the output current signal resulting therefrom to provide a measurement of the applied pressure; and, feedback circuit means, responsive to the output current signal, for rebalancing said amplifying circuit means while sustaining the output current signal at the value proportional to the applied pressure.

2. The transducer circuit as set forth in claim 1, wherein said amplifying circuit means includes output current regulating means and a pair of conductors connected thereto which extend to a remote location from which said pressure transducer circuit is energized and to which the output current signal proportional to the applied pressure is transmitted on said pair of conductors.

3. The transducer circuit as set forth in claim 2, additionally including circuit means for temperature compensating said amplifying circuit means so that the amplified difference signal is substantially independent of the resistance variations caused by temperature changes of said resistance bridge.

4. The transducer circuit as set forth in claim 3, wherein said temperature compensating means includes a resistor $R_x$ connected in electrical series with one of said diffused resistors, said piezoresistor $R_P$ having a temperature coefficient $K_P$ and said second resistor $R_T$ having a temperature coefficient $K_T$, said resistor $R_x$ being substantially temperature insensitive with respect to said diffused resistors, said resistor $R_x$ being series interposed between the outer end of said bridge associated with the one of said diffused resistors having the larger temperature coefficient with respect to the other of said diffused resistors and said amplifying circuit means so that said resistor $R_x$ tends to reduce the effects of temperature coefficient inequality of said diffused resistors and also tends to reduce the zero range shift effects of said amplifying circuit means within a predetermined temperature range.

5. The transducer circuit as set forth in claim 4, wherein said resistor $R_x$ is connected in electrical series with said second resistor $R_T$, corresponding to $K_T$ having a greater value than $K_P$, the resistance of said resistor $R_x$ approximating the value determined by the expression $R_x = (K_T/K_P - 1) R_T$ in order to reduce the effects of temperature coefficient inequality of said diffused resistors.

6. The transducer circuit as set forth in claim 4, wherein said resistor $R_x$ is connected in electrical series with said piezoresistor $R_P$, corresponding to $K_P$ having a greater value than $K_T$, the resistance of said resistor $R_x$ approximating the value determined by the expression $R_x = (K_P/K_T - 1) R_P$ in order to reduce the effects of temperature coefficient inequality of said diffused resistors.

7. The transducer circuit as set forth in claim 3, wherein said temperature compensating means includes a third resistor diffused into the diaphragm, said third resistor $R_{tc}$ being substantially insensitive to pressure variation and having a temperature coefficient $K_{tc}$, said resistor $R_{tc}$ being connected in circuit with said piezoresistor $R_P$ so as to substantially cancel the effects of changing temperature on the incremental increase in resistance $\Delta R$ with pressure variation of said piezoresistor $R_P$, the resistance $\Delta R$ having an effective negative temperature coefficient $K_r$ with respect to the temperature coefficients of said diffused resistors $R_P$, $R_T$ and $R_{tc}$, the temperature coefficient $K_{tc}$ of said resistor $R_{tc}$ approximating the magnitude determined by the expression $K_{tc} = K_r/(1-K_r)$.

8. The transducer circuit of claim 7, wherein said temperature coefficient $K_r$ is small relative to unity and $K_{tc}$ is approximately equal in magnitude to $K_r$.

9. The transducer circuit as set forth in claim 8, wherein the circuit connection for said resistor $R_{tc}$ includes circuit means for passing a substantially constant current through said resistor $R_{tc}$ and means, connected to said resistor $R_{tc}$, for voltage tracking the range shift effects of said amplifier circuit means with a change in temperature so that the difference signal amplified by said amplifier circuit means is substantially independent of temperature changes.

10. The transducer circuit as set forth in claim 3, wherein said amplifying circuit means comprises:

constant-current differential amplifying means including, means for passing a first constant current through said piezoresistor, independent of the pressure applied to the diaphragm, and for passing a second constant current through said second resistor, means for balancing said current passing means so that the difference signal generated between the outer ends of said bridge is zero;

second means, connected to the outer ends of said bridge, for amplifying the difference signal to control the output current signal, said second differential amplifying means connected to said feedback circuit means with appropriate electrical phasing to rebalance said second differential amplifying means to sustain the output current signal at the value proportional to the applied pressure.

11. The transducer circuit as set forth in claim 10, wherein said second amplifying means includes means for adjusting the output current signal to a predetermined minimum value.

12. The transducer circuit as set forth in claim 11, wherein said feedback circuit means includes means for adjusting the span of output signal current between the minimum value and a predetermined maximum value for the maximum applied pressure.

13. The transducer circuit of claim 3, wherein said amplifying circuit means comprises:

differential amplifying means including,
 means for passing a first constant current through said piezoresistor independent of the applied pressure,
 means for passing a second current through said second resistor so that the difference signal generated between the outer ends of said bridge is zero, at least one of said current passing means being connected to said feedback circuit means with appropriate electrical phasing to rebalance said differential amplifying means while sustaining the output current signal at the value proportional to the applied pressure.

14. The transducer of claim 13, wherein said amplifying circuit means includes second differential means, connected to the outer ends of said bridge, for amplifying the difference signal to control the output current signal, said differential amplifying means including means for adjusting the output current signal to a predetermined minimum value when the pressure applied to said bridge is a reference value.

15. The transducer circuit as set forth in claim 14, wherein said feedback circuit means includes means for adjusting the span of output signal current between the minimum value for the reference applied pressure and a predetermined maximum for the maximum applied pressure.

* * * * *